United States Patent
Valentine, Jr. et al.

[15] 3,644,160
[45] Feb. 22, 1972

[54] METHOD OF MAKING MULTILAYER ARTICLES

[72] Inventors: James R. Valentine, Jr., Orange; Ralph C. McBee, Fountain Valley, both of Calif.

[73] Assignee: Comatico Tiles, Inc., Artesia, Calif.

[22] Filed: June 26, 1968

[21] Appl. No.: 740,279

[52] U.S. Cl.............................................156/250, 156/242
[51] Int. Cl...........................................................B32b 31/00
[58] Field of Search........................156/250, 257, 242, 244

[56] References Cited

UNITED STATES PATENTS

| | | | |
|---|---|---|---|
| 1,531,983 | 3/1925 | Sawyer | 156/257 X |
| 2,050,247 | 8/1936 | Cover | 156/250 X |
| 2,980,569 | 4/1961 | Wening | 156/242 X |
| 3,393,107 | 7/1968 | Wilburn | 156/242 |
| 3,415,709 | 12/1968 | Santangelo | 156/257 X |

Primary Examiner—Benjamin A. Borchelt
Assistant Examiner—Dan Bent
Attorney—Noel G. Conway

[57] ABSTRACT

A method of making multilayer articles having a flat frame board wherein each of the faces of the frame board receive a sealing coat and, after a dam is formed around the perimeter of the board, one of the board faces receives a color coat which is considerably thicker than the respective seal coat, which color coat has veins of a contrasting color formed therein, and then a final coat is applied over the color coat, said frame board being cut, in some cases, to the final shape of the article before said coats are applied. The method also effects a seal at the edge of the frame board where an edge mold is located, even though the sealing compound used will not adhere to the edge mold. This is accomplished by providing that the edge mold main body is spaced slightly away from the board edge to permit the sealing compound to fill the space between the board edge and the main body of the edge mold and providing that the edge mold anchor flange, which is received in a slot in the board edge, is provided with a recess thereon which is filled with sealing compound to effect a mechanical gripping by the sealing compound on the edge mold.

15 Claims, 12 Drawing Figures

PATENTED FEB 22 1972 3,644,160
SHEET 1 OF 2
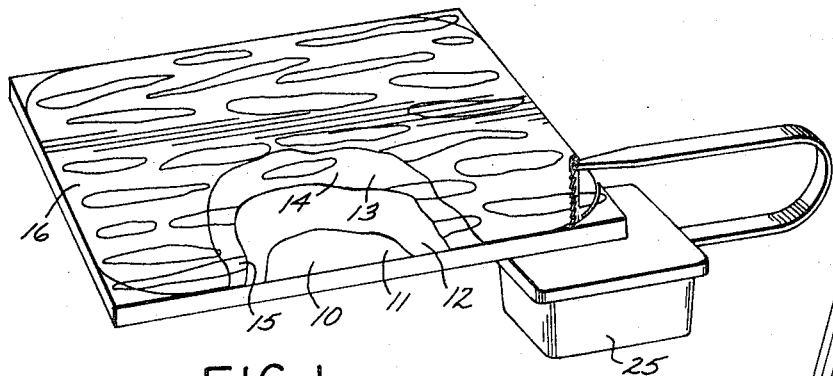
FIG. 1
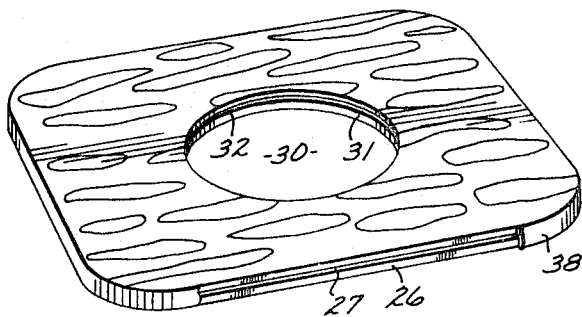
FIG. 2
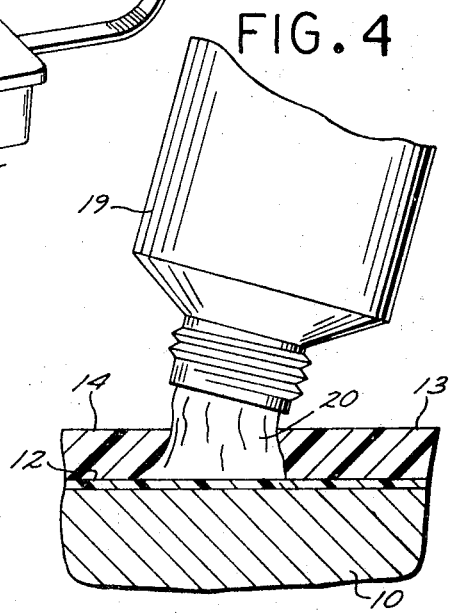
FIG. 4
FIG. 5
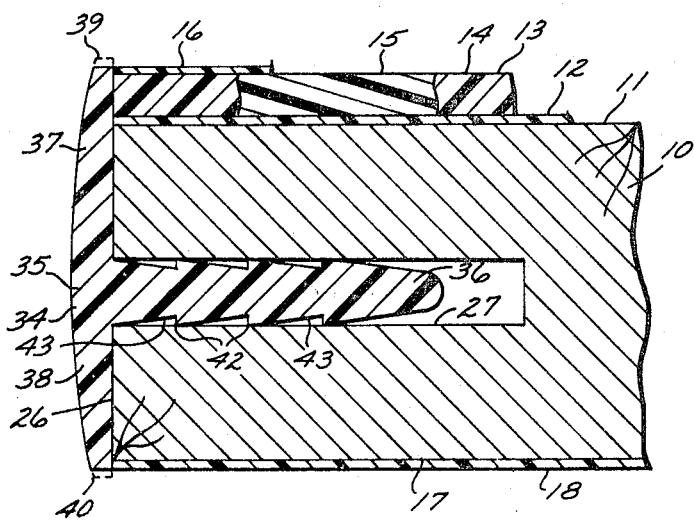
FIG. 3
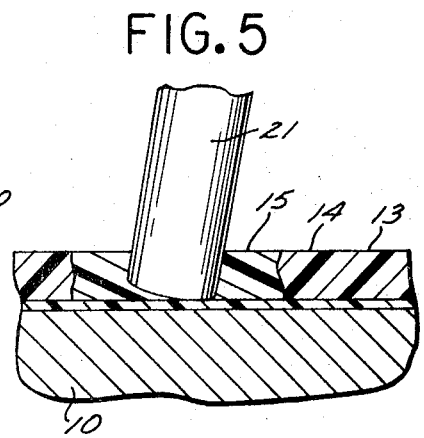
INVENTORS.
JAMES R. VALENTINE JR.
RALPH C. McBEE
BY
Noel G. Conway
ATTORNEY

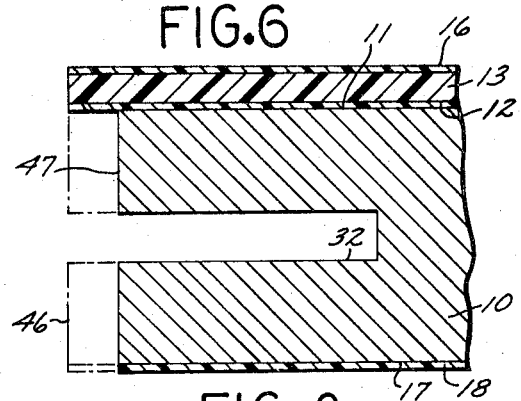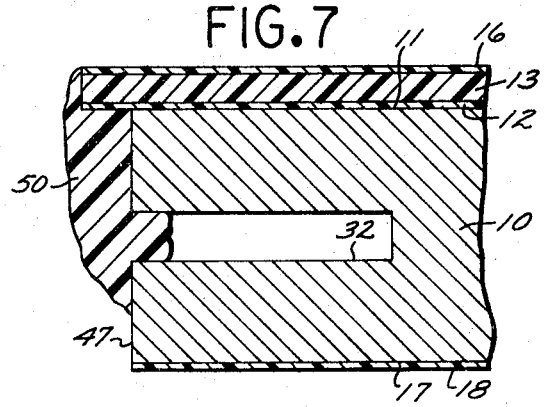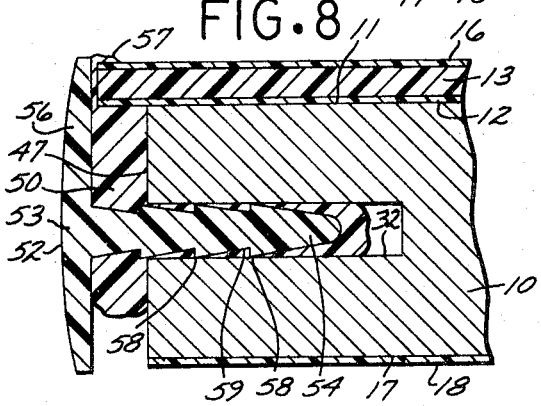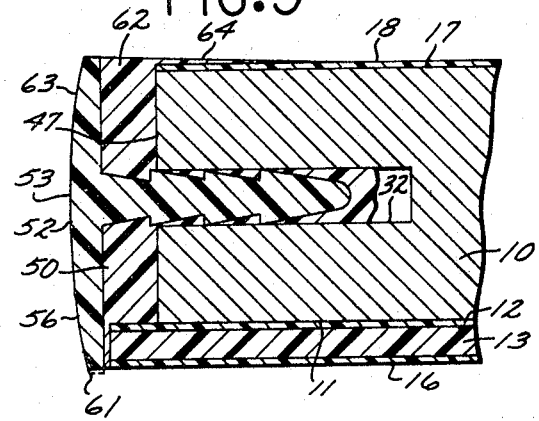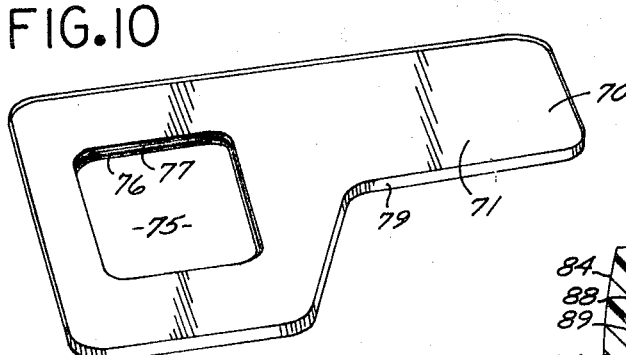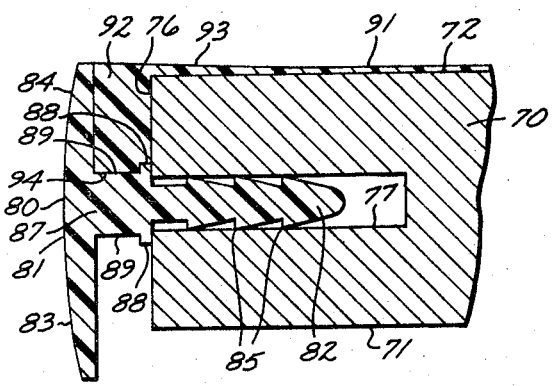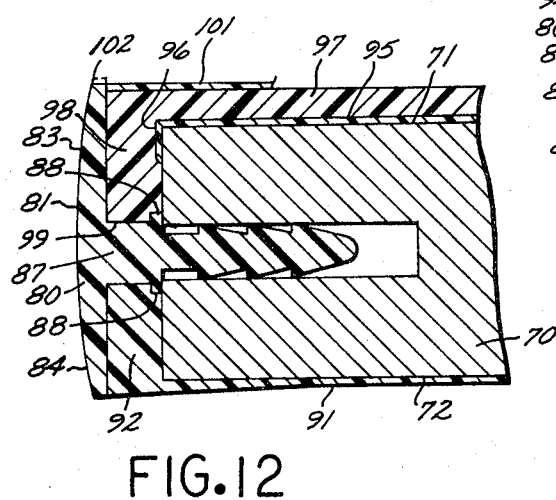

METHOD OF MAKING MULTILAYER ARTICLES

This invention relates to a method of making multilayer articles, and more specifically, to such a method which is particularly useful in producing sink counter tops of irregular shapes.

One use of a method incorporating the present invention is in the mass production of sink counter tops of irregular shapes wherein the counter top is manufactured of plastic and has a rich marble appearance resulting from the use of plastics. The method includes the use of a flat frame board and makes adequate provision for sealing the board against liquid in the area of the hole which receives the sink, which sealing effect is necessary in order to insure longevity of the resulting article. A particular feature of the present invention is the manner in which the sealing is accomplished at the edge of the hole which receives the sink in order to permit the use of an edge mold of a material to which the sealing compound will not adhere. It has been found that the use of a flexible edge mold of a material which will adhere to epoxy or polyester sealing compound results in such sealing compound attacking the edge mold material resulting in an unattractive appearance.

Another aspect of the present invention particularly adapts a method incorporating it to be used in making items such as counter tops and tabletops of irregular shapes without undue waste of the somewhat expensive plastic used for decorative coatings. In this method, the frame board is cut to the irregular shape before the decorative coatings are applied. And, in addition, an edge mold is secured around the perimeter of the article to form a dam in order that a relatively thick coating of decorative plastic may be applied to the article. If the article being produced is a sink counter top, the method includes provision for permitting the hole to receive the sink to be formed in the frame board before the decorative coatings are applied. In such case, the edge mold is applied around the edge of the sinkhole in a particular relation such that a good seal is accomplished along this edge in order to protect the frame board from the liquid which will normally be splashed out of the sink even though the sealing compound cannot adhere to the edge mold. In this case, similarly to the edge mold around the perimeter of the article, the edge mold serves the function of forming a dam to permit the application of at least one relatively thick coat of decorative plastic.

In some cases, it is desired that the decorative coatings be applied before the article is cut to shape including a sinkhole. In such cases, the method incorporating the present invention includes a special shaping of the edge area around the sinkhole in order to provide a proper seal against moisture in this area despite the use of an edge mold which the sealing compound does not adhere to. In such cases, after the decorative coating has been applied, the hole for the sink is cut out. And then, the frame board portion of the edge around the sinkhole is cut back somewhat in order to leave a ledge composed of the decorative coating. And, sealing compound is placed in the area between the main body of the edge mold and the edge of the frame board, which space is adequately maintained because the ledge is formed by that decorative coating and the frame board, and accordingly, a good seal is provided.

With the foregoing in mind, it is a major object of this invention to provide an improved method for producing decorative sink counter tops.

Another object of this invention is to provide an improved method of making multilayer articles having a flat frame board covered on one side by relatively thick decorative coatings.

A further object of this invention is to provide an improved method of making multilayer articles of irregular shape with relatively thick decorative coatings thereon, which method minimizes the waste of the decorative coating material.

It is still another object of this invention to make a decorative sink counter top wherein a good seal is provided around the edge of the sinkhole in the counter top despite the fact that the sealing compound will not adhere to a flexible edge mold used around the edge of the sinkhole in a counter top.

A still further object of this invention is to provide a method for producing decorative multilayer articles at a reduced cost.

It is still another object of this invention to provide a method for making multilayer articles, such as sink counter tops, which are particularly well sealed against liquid.

Another object of this invention is to provide a new edge mold strip for use in providing a sealed edge of a multilayer article.

It is still a further object of this invention to provide an improved method of making multilayer articles having a relatively thick decorative coating applied thereto, and in which method, a flexible plastic edge mold which is incorporated in the final article is used as a dam in order to permit such thick coating of decorative material to be applied.

Other and further objects of this invention will become apparent in the detailed description below in conjunction with the attached drawings wherein:

FIG. 1 is a perspective view of a sink counter top having the previously applied various coatings on one face thereof partially cut away, which counter top has been made by a first preferred method incorporating one aspect of the present invention;

FIG. 2 is a perspective view of the sink counter top disclosed in FIG. 1 after the counter top has been subjected to further steps in the method partially shown in FIG. 1;

FIG. 3 is an enlarged fragmentary cross-sectional view of an edge portion of the sink counter top in FIG. 1 disclosing certain details in the area of the perimeter edge of a counter top made by the method partially shown in FIG. 1;

FIG. 4 is an enlarged fragmentary cross-sectional view of a midportion of the sink counter top shown in FIG. 1 disclosing one step in producing a veining effect in the main decorative coating of the article;

FIG. 5 is an enlarged fragmentary cross-sectional view of the sink counter top in FIG. 1 disclosing details of another step in the method of producing a veining effect in the main decorative coating on the article;

FIG. 6 is an enlarged fragmentary cross-sectional view partially disclosing the method of preparing the edge around the sinkhole in the counter top in FIG. 1 for effecting a good liquid seal;

FIG. 7 is an enlarged fragmentary cross-sectional view of the portion of the sink counter top in FIG. 1 shown in FIG. 6, disclosing a subsequent step in the production of the good liquid seal around the edge of the sinkhole;

FIG. 8 is an enlarged fragmentary cross-sectional view of the portion of the sink counter top shown in FIG. 7, disclosing a step in the method of forming the good liquid seal around the sinkhole, which step is performed subsequent to the step disclosed in FIG. 7;

FIG. 9 is an enlarged fragmentary cross-sectional view of the area disclosed in FIG. 8 disclosing a step in the method of producing the good liquid seal around the edge of the sinkhole, which step in the method is subsequent to the step disclosed in FIG. 8;

FIG. 10 is a perspective view of a partially finished sink counter top of irregular shape which top is produced by a second preferred method incorporating other aspects of the present invention;

FIG. 11 is an enlarged fragmentary cross-sectional view at the edge of the sinkhole of the frame board shown in FIG. 10, disclosing one step in producing a good liquid seal at said edge by said second preferred method; and, FIG. 12 is an enlarged fragmentary cross-sectional view of the area shown in FIG. 11 disclosing another step in the second preferred method of effecting a good liquid seal at the edge of the sinkhole in the counter top.

Referring now to FIGS. 1 to 9, there will be described in detail the present inventive method wherein a sink counter top is made with the decorative coatings being applied before the article is cut to shape.

Referring now to FIG. 1, there is shown a frame board 10, which preferably is made of material such as particle board. This frame board 10 has a first face 11 coated with a seal coat 12 in direct contact with the first face. The seal coat 12 is covered by a relatively thick color coat 13 which is preferably made up of a main, or background, portion 14 with veins 15 of a contrasting color. Over the color coat 13 there is a top or finish coat 16. As can be seen in FIG. 3, the frame board 10 has a second face 17 which is sealed by a seal coat 18.

The frame board 10 with its coats 12, 13, 16, and 18 are preferably produced in the following manner. Firstly, the frame board 10 is placed in a horizontal position on a table. At that time, a dam is formed around the perimeter edge of the frame board. In this method, the dam is formed with the use of, by way of example, masking tape (not shown) adhered to the perimeter edge of the board. The masking tape has sufficient width that it projects, for example, approximately one-fourth of an inch above the first face 11. It does not need to extend below the second face 17 because the seal coat 18 is relatively thin, as will be explained.

The seal coat 12 is then applied by painting a polyester sealer thereon. The seal coat is preferably straight resin with 1 percent MEK peroxide as a catalyst. It has been found to be sufficient if it is painted on at a thickness at about 2 oz. per square foot. If it is desired to conceal the grain of the frame board 10, a color pigment may be added to the seal coat. After the seal coat is applied, it is allowed to cure. At normal room temperature, the curing time takes approximately 1 hour.

Then, the main, or background, portion 14 of the color coat 13 is flowed onto the seal coat 12 approximately one thirty-seconds to three thirty-seconds of an inch thick. The color coat is preferably a polyester resin having 1 percent MEK peroxide as a catalyst. Prior to applying the color coat, a pigment, or dye, is added to the color coat, if desired. The pigment, or dye, may be the same color as the seal coat 12, or it may be a contrasting or complimentary color. The amount of pigment used can be varied, however, it has been found that approximately 10 oz. of pigment for 5 gallons of clear resin will give a satisfactory background effect for the veins 15. Alternatively, if a color has been added to the seal coat 12, there may be no pigment put in the color coat portion 14 in order to give the resulting article an unusual depth effect.

The veining effect of the veins 15 is preferably provided in the following manner. Firstly, the composition for the veining effect is prepared. In order to produce a contrast, it is desired that the material which produces the veining effect have considerably more color than the material which forms portion 14. Although, other compositions can be used, it has been found that the veining effect can be accomplished well with a composition which is 1 part pigment to 1 part polyester resin to 2 parts acetone. The acetone has the effect of allowing the resulting composition to float somewhat on the main, or background, portion 14 of the color coat 13. This facilitates achieving the desired effect by stirring the composition into the main, or background, portion 14.

The contrast color is then applied to the main portion 14 of the color coat 13 as illustrated in FIG. 4 with contrast color, identified by the numeral 20, coming out of the applicator 19. Preferably, the contrast color is applied in strips in order to provide a veining effect similar to marble. After the material has been applied to various places, it is stirred with a stirrer 21 (see FIG. 5) in order to augment the veining effect. As mentioned above, the use of the acetone facilitates achieving the desired effects through this stirring action.

After the veining effect has been accomplished the color coat is allowed to cure. The cure time takes approximately an hour at room temperature.

After the color coat 13 has cured, a clear finish coat of polyester resin is applied by, e.g., brushing. Preferably, this coat is a polyester resin to which there has been added 1 percent MEK peroxide as a catalyst. This finish coat 16 is relatively thin. However, it must be thick enough in order to fill in the depressions in the color coat 13 which normally results because of the thickness of the coat. The finish coat 16 takes approximately 1 hour to cure.

Preferably, the dam is removed after the finish coat 16 is applied and cured. However, it can be removed before such application since the coat 16 is not thick as in the case of the color coat 13.

Then, the finish coat is sanded to get rid of any "orange peel" or any bugs which may settle. Preferably, 150-grit sand paper is used initially, and then 220-grit sand paper is used. After the sanding process has been completed, the decorative surface is buffed using a cloth buffer with a coarse rubbing compound and then with fine rubbing compound.

After the first face 11 has been coated as described, the second face 17 can be coated by turning over the frame board 10 and painting on the seal coat 18. The seal coat 18 is preferably a polyester sealer composed of a straight resin with 1 percent MEK peroxide as a catalyst, and is brushed on at a rate of approximately 2 oz. per square foot. Other sealers can be used to seal the face of the board. However, the resin sealer is definitely preferred as the resin counteracts the tendency of the coatings on the first face 11 to curl the frame board 10 in that direction.

Although, the method has been described in terms of coating the first face 11 first, the second face 17 can be coated first. If the second face 17 is coated first, there is eliminated the possibility of damaging the finish coating 16 on the first face 11 while coating the second face 12.

After the frame board 10 has been prepared as above described, it is then cut to the shape of the final article. By way of example, there is shown in FIG. 1 the use of a saw 25 which cuts off the corners to form a generally rectangular sink counter having rounded corners. The resulting structure has a perimeter edge 26 into which there is cut a slot 27 extending around the perimeter edge. This slot 27 is approximately midway between the first and second faces 11 and 17, and is approximately three-fourths of an inch deep for a purpose to be described.

The frame board 10 is also further cut to provide a sinkhole 30 having a perimeter edge 31 around it with a slot 32 extending around that edge approximately midway between the first and second faces 11 and 17 for a purpose to be described.

After the frame board 10 has been cut to the desired shape, an edge mold 34 is placed in position around said perimeter edge 26. Preferably, the edge mold 34 is extruded with a cross section to be described. Then, the edge mold is cut to the desired length for the particular article being produced. The edge mold 34 is made of a flexible plastic such as polypropylene or a butyrate. The edge mold 34 can be made of butyrate since it does not come into contact with uncured resin. However, as will be described further below, the edge mold which is used around the sinkholes is preferably made of a material which does not react to uncured epoxy or polyester resins in order to permit the use of these materials at that location.

Referring now to FIG. 3, the edge mold 34 will be described in further detail. The edge mold 34 has a main body 36 with an anchor flange 36 extending at a right angle to the main body at approximately the midsection thereof. The main body 35 has an upstanding flange 37 and a depending flange 38. The upstanding flange 37 may project slightly further than the depending flange 38 in order to accommodate the extra thickness of the three coats 12, 13 and 16 as compared to the single coat 18. However, this extra thickness can also be accommodated by the positioning of the slot 27 relative to the first face 11 and the second face 17. In either event, it is preferred that the main body 35 of the edge mold 34 have its flanges 37 and 38 project sufficiently to extend beyond the exposed surfaces of the coats 16 and 18. Then, the projecting edge of the respective flanges 37 and 38 may be cut or otherwise removed down to the level of the exposed surfaces of said coats 16 and 18. In FIG. 3, dashed line 39 illustrates the removal of the edge of the flange 37 and dashed line 40 illustrates the similar removal of the edge of the flange 38.

The anchor flange 36 is received into the slot 27 as shown. The anchor flange 36 is further defined by a plurality of ribs 42 which form a series of recesses 43 therebetween. A recess 43 is also formed between the left-hand rib 42 (as seen in FIG.

3) and the main body 35. The ribs 42 project sufficiently that they securely engage the walls of the slot 27. Therefore, the anchor flange 36 may be driven into the slot 27 by, e.g., a mallet, and the friction between the ribs 42 and the walls of the slot will cause the edge mold 34 to be relatively securely held in position.

Referring now FIGS. 6 to 9, the method of effecting a good liquid seal around the edge 31 of the sinkhole 30 will be described in detail. It is extremely important that the frame board 10 be sealed against liquid in order to avoid undue warping and other adverse effects. The type of arrangement disclosed in FIG. 3 would not be sufficient since liquid could leak down between the flange 37 and the edge of the coats 12, 13, and 16, and thereby gain access to the frame board 10. In order to effect a good seal around an edge of a hole cut in the frame board 10 after the coats 12, 13, 16, and 18 have been applied, the inventive method, disclosed by the following description of a preferred embodiment thereof, should be used.

Firstly, the material of the frame board 10 at the edge 31 is cut away approximately one-eighth to three-sixteenths of an inch to leave a ledge made up of the decorative coat resulting from the coats 12, 13, and 16. In FIG. 6, a centerline 46 is included to show the original position of the edge 31. As can be seen, the frame board 10 has been undercut to the position of edge 47 a distance of approximately the above-mentioned amount. The distance of this undercutting is illustrated by dimension line 48. It has been found that it is best to cut the slot 32 before the undercutting operation. This eliminates all possibility of irregularity at the line of joinder of the particular edge and the wall of the slot.

After the undercutting operation has been completed, an amount of rather stiff sealing compound 50 is applied around the edge of the sinkhole as illustrated in the cross section in FIG. 7.

This sealing compound is preferably composed of thickened epoxy or polyester resin. In the latter case, a thixatropic material, cabosil, will make the resin sufficiently dense and thick if approximately equal amounts of resin and cabosil are used. Then, a catalyst of about 1 percent MEK peroxide is added. The epoxy resin can be appropriately stiffened if needed. In either case, the sealing compound 50 is made sufficiently still that it will stay in the position disclosed until the edge mold 34 is positioned. It will be noted that the sealing compound 50 has been extended up around the end of the ledge formed by the coats 12, 13, and 16, and also extended down across the entrance to the slot 32. In addition, there is sufficient sealing compound 50 used in order to accomplish the result which will now be described.

Referring now to FIG. 8, this shows the edge section after an edge mold 52 has been positioned. This edge mold 52 is just like the edge mold 34 except that it should not be made out of butyrate, but rather should be made of polypropylene in order that the above-described sealing compound 50 will not react with it and destroy its attractiveness. The use of such inert (as related to the sealing compound) material is permitted by the particular structure resulting from the method.

The edge mold 52 has a main body 53 and an anchor flange 54 extending at approximately right angles to the main body. The main body 53 has an upstanding flange 56 which extends beyond the top of the coat 16. When the edge mold 52 is forced into the position shown—because of the amount of sealing compound 50 previously placed in position—part of the sealing compound is forced out of the area between the edge 47 and the flange 56 up past the edge of the ledge formed by the coats 12, 13 and 16 with an excess of the extruded compound ending on top of the coat 16 as at 57. This sealing compound 50 will adhere to the edge of the coats 12, 13 and 16 as well as to the underside of the coat 12 and the frame board 10 to effect a good seal in this area.

In practice, there is only an extremely thin layer of sealing compound 50 at the edges of the coats 12, 13 and 16, since pressure on the flange 56 forces it out. The layer is shown somewhat thicker for ease of viewing in the drawing—as is the case with the coats 12, 13, 16, and 18.

In addition, it will be noted that the anchor flange 54 has a plurality of ribs 58 extending therealong and forming a plurality of recesses 59 directly comparable to the recesses 43 of the edge mold 34. As the anchor flange 54 is forced into the slot 32, the sealing compound 50 is forced into the recesses 59 to the position shown. Then, when the sealing compound 50 is cured, it adheres to the wall of the slot 32 and mechanically grips the anchor flange 54 to securely hold the edge mold 52 in position. As in the case of the edge mold 34, the flange 56 has its edge removed to be even with the exposed surface of the coat 16. Dashed line 61 (see FIG. 9) illustrates the former position of the edge of the flange 56.

After the foregoing steps have been completed, the frame board 10 is turned over to the position shown in FIG. 9. With the frame board in that position, sealing compound 62, preferably made of the same composition as the compound 50, is applied into the area between edge mold main body flange 63 and the edge 47. In this case, the edge of the flange 63 is not trimmed off in order that a tapered flashing 64 may be provided to effect an excellent seal between the sealing compound 64 and the 62 and the seal coat 18.

Although the foregoing method has been described with the sealing compound being applied first to seal the area between the anchor flange 54 and the first face 11, the following modification of the method could be used. The frame board 10 could be positioned with the face 17 upward. Then, sealing compound 50 is applied in sufficient quantity across the entire edge 47 and then the edge mold 52 is positioned as shown. This will result in filling the space between the edge 47 and the flange 56. Additional sealing compound is added as needed to finish filling the space between the flange 63 and the edge 47, and to furnish the tapered flashing 64. Also, the trimming of the edge of the flange 56 can be delayed until after the sealing on both sides of the anchor flange 54 has been accomplished.

Although epoxy or polyester resin is preferred for the sealing compound, regular waterproof caulking compound could be used. In such case, a butyrate edge mold might be used as it is inert to such caulking compound.

Referring now to FIGS. 10 to 12, a second preferred method incorporating the present invention will be described in detail. This particular method is particularly well suited to producing multilayer articles of irregular shape wherein one is particularly desirous of avoiding the waste of coated frame board.

In FIG. 10 there is disclosed a sink counter top having such an irregular shape. In this FIG., there is a frame board 70 having a first face 71 and a second face 72 (see FIGS. 11 and 12). A sinkhole 75 has been cut in the frame hole 70, and there is provided a perimeter edge 76 around the sinkhole a slot 77 which is the same as the previously described slots.

In this method, a slot is formed around the perimeter edge of the frame board 70 the same as the slot 27 was formed around the frame board 10 (except that no coats have been previously applied to the frame board). Then, edge mold 79 (which is preferably the same as the edge mold 52 in shape and composition) is positioned around the perimeter of the frame member 70 with its anchor flange being received in a slot in said perimeter edge. The details of the edge mold 79 and the slot into which its anchor flange is received, are not disclosed as they are substantially the same as described above.

The details of the structure at the edge 76 of the sinkhole 75 are disclosed in FIGS. 11 and 12. There is disclosed a cross section of edge mold 80, preferably polypropylene, which has a structure slightly different than the other edge molds 34 and 52. The edge mold 80 has a main body 81 with an anchor flange 82 projecting at a right angle from approximately the center of the main body. The main body 81 includes a first flange 83 and a second flange 84 projecting in opposite directions (as seen in cross section) substantially the same as the edge mold 52. The anchor flange 82 is also provided with ribs 85 at its portion received in the slot 77, which ribs effect a frictional gripping of the sides of the slot 77.

It is important to note that the anchor flange 82 has an enlargement 87 in the area of the main body 81. This enlargement 87 has a pair of oppositely projecting ribs 88 which define a pair of recesses on the enlargement for a purpose to be described. The enlargement 87, and particularly the ribs 88, have a thickness which is greater than the width of the slot 77. Therefore, the right end (as seen in FIG. 11) of the enlargement 87 provides a shoulder which holds the flanges 83 and 84 of the main body 81 spaced slightly away from the edge 76. Preferably, the amount of this spacing is approximately one-eighth to three-sixteenths of an inch.

After the edge mold 79 and the edge mold 80 have been positioned as described, the frame board 70 is turned to the position shown in FIG. 11. At that time, a seal coat 91 is applied to the second face 72. The seal coat is, preferably, a polyester sealer of the same composition as the seal coat 18. It is important to note that there is sufficient amounts of the seal coat material used to provide a sealing compound in the area between the flange 84 and the edge 76 as at 92. It can be seen that the flange 84 acts as a dam to contain the compound. It can also be seen that there is a tapered section 93 on the seal coat 91 in order to provide a somewhat thicker coat in the area of the line of joinder of the edge 76 with the second face 72. After this seal coat material has cured, the edge mold 80 is securely bound to the edge 76 by means of the sealing compound at 92 which adheres to the edge 76 and mechanically grips the upper (as seen in FIG. 11) rib 88.

After the seal coat composition on the face 72 has cured, the frame board 70 is turned over to the position shown in FIG. 12. At that time, a seal coat 92 is applied to the first face 71. This material will be painted up to the edge 76 and may flow slightly over as at 96. The seal coat 95 is preferably of the same composition as the seal coat 12.

After the seal coat 95 has cured, a relatively thick color coat 95 is applied. As can be seen, the color coat 97 flows over the edge 76 of the frame board 70 and fills the area between the flange 83 and said frame board edge as at 98 and fills the recess between the flange 83 and the respective rib 88 as at 99. It will be noted that the flange 83 acts as a dam to permit a relatively thick color coat 97 to be applied.

The color coat 95 has, preferably, a decorative veining effect therein. As it is produced the same way as in the case of color coat 13, it will not be shown and described in detail.

After the color coat 97 has cured, a finish coat 101 is applied over the color coat to provide a smooth surface. This finish coat 101 is of the same composition and is finished in the same manner as described in connection with the finish coat 16. Dashed line 102 in FIG. 12 illustrates the fact that the edge of the flange 83 has been removed in order to bring the flange even with the exposed surface of the coat 101.

The details of the edge flange 79, and the method of mounting the edge flange will not be shown or described in detail as it is substantially the same in cross section as the edge mold 34, and the resulting structure after the method looks substantially the same as in FIG. 3. Such structure will not effect a very good liquid seal. However, a good liquid seal is not too important out at those peripheral areas. In such cases as a good liquid seal is mandatory at the periphery of the counter top, an edge structure such as provided at the edge 76 can be used.

While only a few embodiments of the present invention have been shown and described in detail, it will be apparent to those skilled in the art that such is by way of illustration only and numerous changes can be made thereto without departing from the spirit of the present invention. Accordingly, it is our intention that the invention be limited solely by the appended claims.

We claim:

1. The method of producing multilayer articles comprising the steps of:

positioning a frame board having a first and a second face with a predetermined thickness;

cutting in said frame board a hole with an edge therearound, which hole is adapted to receive a sink;

forming a slot in the edge around said hole, said slot extending around said hole approximately midway between the first and second face of the frame board;

positioning an edge mold having a main body with an anchor flange projecting at a right angle to the main body of the edge mold;

placing around said edge sealing compound and said edge mold with the anchor flange being positioned into said slot and the main body of said edge mold being spaced slightly away from said edge and with said sealing compound filling said space between said main body and said edge on the side of said anchor flange nearest said first face;

and curing said sealing compound.

2. The method set forth in claim 1 including the steps of:

applying a seal coat to said second face;

and filling with sealing compound the space between said edge mold and the edge on the side of said anchor flange nearest said second face.

3. The method set forth in claim 1 including the step of:

spacing said main body of said edge mold from said edge by an enlargement on said flange adjacent said main body having a thickness greater than the width of said slot.

4. The method set forth in claim 3 wherein said enlargement has a recess between the main body and the part of the enlargement in engagement with the edge, and including the steps of:

filling said recess with said sealing compound whereby the sealing compound in said recess aids in holding edge mold in position.

5. The method set forth in claim 3 including the steps of:

applying a seal coat to said first face;

applying a color coat to said first face;

and filling said space between said main body of said edge mold on the side of said anchor flange nearest said first face with at least one of the seal coat material and the color coat material.

6. The method set forth in claim 1 including the steps of:

applying and curing a seal coat and a color coat to said first face before said hole for said sink is formed;

removing from the edge around said hole before said edge mold is placed in position a predetermined thickness of said board to leave a ledge formed by said color coat and seal coat;

applying said sealing compound around said edge in the area extending from said ledge to said slot in an amount in excess of the thickness removed from said edge;

squeezing some of said sealing compound from the space between the main body of said edge mold past the edge of said ledge by said step of positioning the edge mold anchor flange into said slot and pressing the edge mold toward the edge until said main body engages said ledge;

removing the sealing compound which is squeezed past the edge of said ledge;

and curing said sealing compound.

7. The method set forth in claim 6 including the steps of filling with sealing compound the space between said edge mold main body and the edge on the side of the anchor flange nearest said second face of the frame board;

and curing said sealing compound.

8. The method set forth in claim 6 wherein said anchor flange has at least one recess formed by a rib thereon spaced from and extending parallel to the main body, and including the step of:

causing said sealing compound to fill the recess between said main body and said rib before the sealing compound is cured, whereby the sealing compound can mechanically hold the edge mold after the sealing compound is cured.

9. The method of providing a seal at an edge formed on a frame board having a first and a second face and a predetermined thickness, said method including the steps of:

forming a slot in said edge approximately midway between said first and second faces and extending the length of said edge to be sealed;

positioning an edge mold having a main body with an anchor flange extending at a right angle to said main body, said anchor flange having thereon a projecting rib spaced away from and extending generally parallel to said main body to provide a longitudinal recess between said main body and said rib;

placing sealing compound and said edge mold along said edge with said anchor flange in said slot and with said main body spaced slightly away from said edge and with said sealing compound filling the space between said edge and said main body and filling said recess;

and curing said sealing compound.

10. The method set forth in claim 9 wherein said slot has a predetermined width and said anchor flange has an enlargement at the portion of the flange adjacent the main body which enlargement is thicker than the width of the slot and said rib is on said enlargement, including the step of:

placing said edge mold engagement against the edge whereby the edge mold main body is spaced away from said edge a distance equal to the amount that the enlargement extends from said main body.

11. The method set forth in claim 9 wherein said rib and recess are located on the portion of said anchor flange which is received in said slot, and including the step of:

placing sealing compound on said edge covering said slot before the edge mold is placed along said edge, so that the insertion of the anchor flange into the slot forces the sealing compound into the slot and part of the sealing compound is received in said recess formed by said rib.

12. A method of making multilayered articles comprising the steps of:

positioning a frame board having a first and second face and a predetermined thickness;

applying to said second face a seal coat and curing said seal coat;

applying to said first face a seal coat of predetermined thickness and curing said seal coat;

applying to said first face a color coat of a thickness substantially greater than said seal coat on said last-mentioned face;

curing said color coat;

securing a dam to said frame board around the perimeter edge of said frame board before said color coat is applied such that the dam contains the color coat material on said first face even though the coat is of a thickness substantially greater than said last-mentioned seal coat.

13. The method set forth in claim 12 wherein there is applied at different positions to said color coat before it is cured a solution comprising:

1 part pigment, 1 part resin and 2 parts acetone, said acetone permitting the solution to float in said color coat;

and stirring said solution into veins in said color coat.

14. The method set forth in claim 12 including the following steps before the color coat is applied:

cutting the frame board to a desired shape with a perimeter edge therearound;

forming a slot of predetermined depth and width at a midportion of said perimeter edge extending around said perimeter edge;

forcing into said slot an anchor flange of an edge mold strip having a T-shaped cross section with a generally flat main body and an anchor flange extending from a midportion of said main body at a right angle to said main body, said main body having a flange which extends beyond said first face to provide said dam.

15. A method of making multilayered articles comprising the steps of:

positioning a frame board having a first and a second face and a predetermined thickness;

cutting said frame board to a desired shape with a perimeter edge therearound;

forming a slot of predetermined width and depth at a midportion of said perimeter edge extending around said perimeter edge;

forcing into said slot an anchor flange of an edge mold strip having a T-shaped cross section with a generally flat main body and an anchor flange extending from a midportion of said main body at a right angle to said main body, said main body extending beyond said first and second faces a predetermined distance;

applying to said first face a color coat of material of a substantial thickness which less than said predetermined distance that said main body extends beyond said first face, whereby said main body forms a dam to contain said color coat on said first face before said color coat is cured;

and curing said color coat.

* * * * *

PO-1050
(5/69)

UNITED STATES PATENT OFFICE
CERTIFICATE OF CORRECTION

Patent No. 3,644,160            Dated February 22, 1972

Inventor(s) James R. Valentine, Jr., et al.

It is certified that error appears in the above-identified patent and that said Letters Patent are hereby corrected as shown below:

Column 4, line 53, remove "36" and insert--35--.

Column 5, line 44, remove "still" and insert--stiff--.

Column 7, line 33, remove "92" and insert--95--.

Column 8, line 20, before "edge mold" insert--main body of said--.

Column 9, line 21, remove "engagement" and insert--enlargement--.

Signed and sealed this 11th day of July 1972.

(SEAL)
Attest:

EDWARD M. FLETCHER, JR.
Attesting Officer

ROBERT GOTTSCHALK
Commissioner of Patents